Jan. 5, 1965
A. A. ROOD
3,163,986
HYDRAULIC STEERING SYSTEM
Filed Nov. 14, 1963
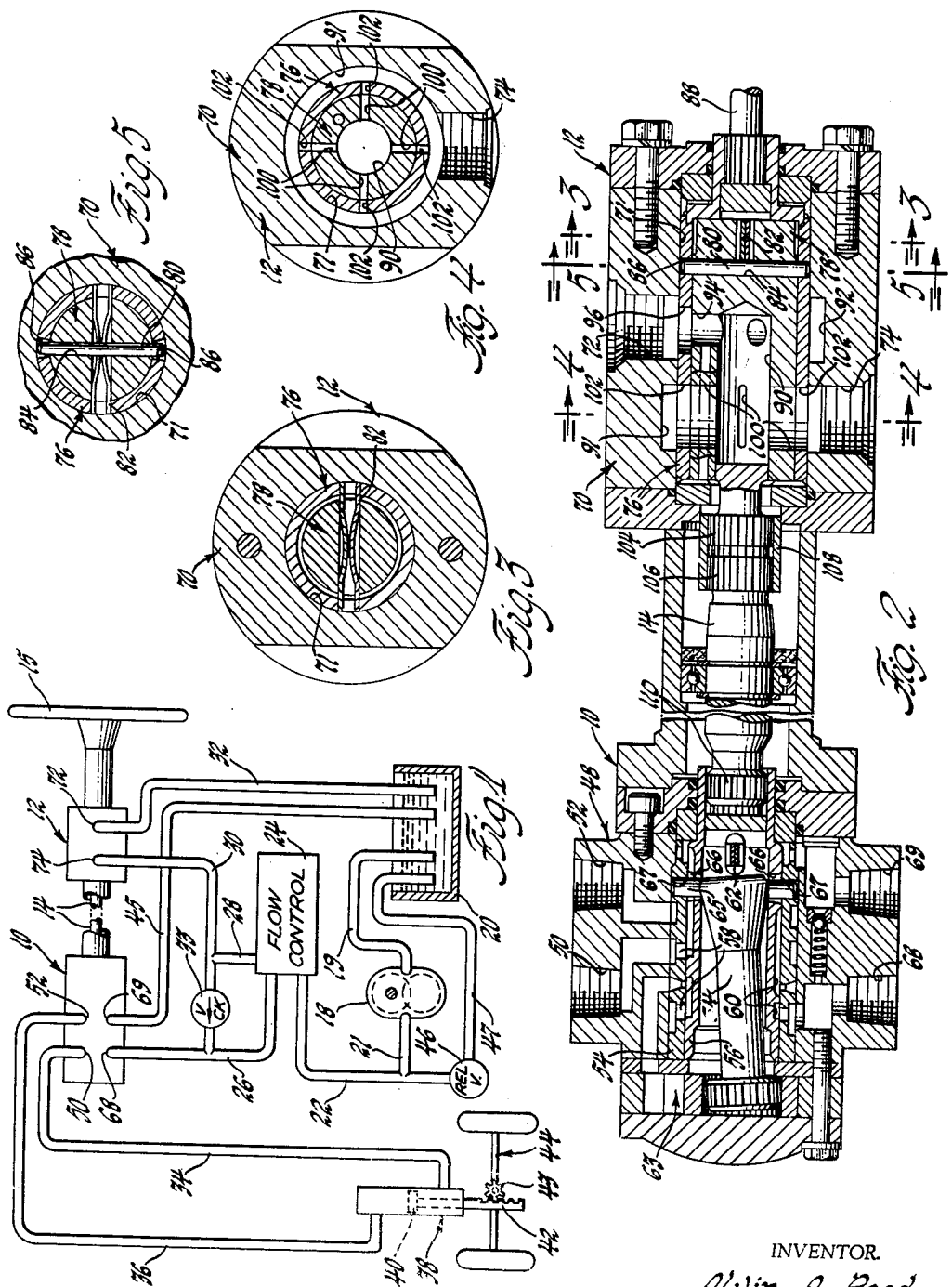
INVENTOR.
Alvin A. Rood
BY
W. J. Wagner
ATTORNEY United States Patent Office 3,163,986
Patented Jan. 5, 1965

3,163,986
HYDRAULIC STEERING SYSTEM
Alvin A. Rood, Willoughby, Ohio, assignor to General Motors Corporation, Detroit, Mich., a corporation of Delaware
Filed Nov. 14, 1963, Ser. No. 323,819
8 Claims. (Cl. 60—52)

This invention relates to hydraulic steering systems for vehicles and, particularly to a system of the so-called fully hydraulic type. In this type of system a hydraulic circuit is the only actuating connection between the steering wheel or other controlling member and the hydraulic steering cylinder, there being no mechanical linkage or connection therebetween and steering control is effected by a full-power steering control valve unit which meters fluid flow in the circuit. The typical full-power steering control valve unit is connected with a steering wheel and comprises two sections, one of which includes the valving that controls the direction of oil flow while the other has a fixed displacement rotary metering motor. In the neutral or straight-ahead position of the steering wheel, the valving is maintained in an open center circuit; however, as the steering wheel is turned the incoming pressurized oil is directed to one side of the motor wherefrom it flows to the remote steering cylinder through an appropriate power port. When the source of pressurized oil fails, for example due to a disabled engine, the steering control valve becomes a manual steering system with the motor acting as a rotary hand pump driven by rotating the steering wheel.

Often, the full-power steering control valve described above is designed for use with farm equipment and the like in which the hydraulic circuits employed have a relatively low flow rate. Accordingly, when it is desired to utilize the same steering control valve with higher capacity circuits such as are commonly used on earthmoving vehicles, the practice has been to provide a flow-control device in the circuit so that excess oil is routed to the reservoir without passing through the control valve. One difficulty with the latter described arrangement, however, is that a flow-control device will at times stick in an open position due to dirt or other foreign matter in the oil, and when this does happen, substantially the entire oil flow takes the path of least resistance and by-passes the steering valve. As a result there is a loss of steering because, among other reasons, the manually-operated motor of the steering control valve lacks the capacity to supply sufficient oil to the cylinders for steering purposes.

Accordingly, the present invention contemplates a full hydraulic steering system employing a flow control valve and being characterized in that means are associated with the steering control valve so that whenever the flow control valve sticks in an open position, an increased torque applied to the steering wheel causes the oil flow to be connected with the steering control valve to prevent loss of steering. More specifically, the present invention includes a fail-safe valve that is interposed between the steering control valve and the steering wheel. The fail-safe valve is actuated by rotating the steering wheel and is provided with resilient means which normally maintains the valve in an open position unless an increased torque is applied to the wheel. When in an open position, the fail-safe valve receives the excess oil passing through the flow control unit and returns it to tank; however, in the event the flow control valve sticks in the open position increased torque applied on the steering wheel results in the resilient means being overcome and a closing of the fail-safe valve. Appropriate means connect the fail-safe valve with the steering control valve so that upon closing the former, the pressurized fluid is prevented from returning to tank and is directed instead through a check valve to the pressurized port of the steering control valve to maintain steering.

A better understanding of this invention can be obtained from the following detailed description when taken in conjunction with the drawings in which:

FIGURE 1 is a schematic diagram illustrating a full hydraulic system made in accordance with the invention and associated with a vehicle wheel assembly;

FIGURE 2 is an enlarged sectional view illustrating the details of the full fluid control valve and fail-safe valve utilized with the system of FIGURE 1;

FIGURE 3 is a view taken on lines 3—3 of FIGURE 2;

FIGURE 4 is a view taken on lines 4—4 of FIGURE 2; and

FIGURE 5 is a view taken on lines 5—5 of FIGURE 2.

Referring now to the drawings, and specifically FIGURE 1, a full hydraulic steering system is shown incorporating a rotary steering control valve 10 and a fail-safe valve 12. The two valves are interconnected by a shaft 14 so that both operate, in a manner to be described, in response to rotation of a steering wheel 15 that extends from the fail-safe valve 12. A pump 18, which is normally driven by the engine of the vehicle, draws fluid through conduit 19 from a reservoir 20 and directs it via conduits 21 and 22 to a fluid flow-control device 24. Although not shown in detail, the flow-control device 24 is conventional in design having a spring-biased poppet valve that is provided with an orifice for permitting only a predetermined flow through conduit 26 and accordingly to the steering control valve. Excess oil flow generated by the pump causes the poppet valve to open against the bias of the spring to direct such excess flow through conduits 28, 30, the fail-safe valve, and conduit 32 to the reservoir. A check valve 33 is provided in conduit 30 for normally preventing the excess flow from being connected with the steering control valve via conduit 26 except under circumstances which will be discussed hereinafter.

The steering control valve unit 10 connects with conduits 34 and 36 that lead to the opposite ends of a double-acting power cylinder or hydraulic jack 38 which includes the usual piston 40. The rod portion of the piston is formed with a rack 42 that engages a pinion 43 rigidly connected to the vehicle wheel assembly 44. Depending on the direction the vehicle is to be steered, one end or the other of the jack 38 is pressurized while the non-pressurized end is vented through the associated conduit and conduit 45 to the reservoir. In addition, it should be noted that in the event that the pressures developed by the pump 18 exceed safe pressure levels through imposed load or otherwise, a relief valve 46 is provided which permits the excess pressure to be relieved via the conduit 47.

FIGURE 2 illustrates in detail the full power steering control valve 10 utilized with this invention. More specifically, this steering control valve comprises a cylindrical housing 48 which is provided with ports 50 and 52 which respectively connect with conduits 34 and 36 that lead to the power cylinder 38. The ports 50 and 52 communicate with the center of the housing 48 which rotatably accommodates concentric sleeve and spool valves 54 and 56 respectively. The sleeve valve 54 is provided with a plurality of spaced ports (those that can be seen being indicated by the numeral 58), while the spool valve 56 has the outer circumference thereof grooved so as to define passages 60 of various lengths. The passages and ports are adapted to cooperate with each other for connecting the pump 18 with the conduits 34, 36 and 45.

Inasmuch as the details of the steering control valve 10 per se form no part of this invention a specific description thereof is not considered necessary and it should suffice to mention that normally the sleeve and spool valves 54 and 56 are held in the neutral position by a pair of leaf springs 62 in the manner disclosed in FIG. 3, and it is only when the sleeve valve 54 is rotated relative to the spool valve 56 that fluid is directed to one of the ports 50 or 52. The relative displacement of the respective valves occurs as a result of rotative movement being resisted by a metering or motor unit 63 that is connected through a shaft 64 and pin 65 to the sleeve and spool valves. In this regard the spool and sleeve valves have aligned bores 66 and 67, one of which snugly, while the other loosely, accommodates the pin 65 to form a lost-motion connection. Thus, initial rotation of the shaft 14 causes the spool valve 56 to move relative to the sleeve valve 54 against the bias of the leaf springs 62 until the pin 65 bottoms at which time both valves rotate together in the displaced position, permitting the pump to be connected through port 68 and the metering unit 63 to one of the ports 50 or 52. Assuming port 50 is pressurized then return flow from the hydraulic cylinder 38 passes through port 52, the appropriate port and groove in the sleeve and spool valves, port 69 and conduit 34 to the reservoir.

It should be noted that FIG. 2 illustrates in detail one form of a steering control valve which may be incorporated with this invention. Another form is shown in the copending patent application, Serial Number 297,556, Zeigler et al. filed July 25, 1963, and assigned to the assignee of this invention, in which the control unit employs a torsion rod rather than a pair of leaf springs for normally maintaining the spool and sleeve valves in a neutral position. Thus, the twisting of the torsion rod provides lost motion which results in a relative axial displacement of a pair of valve members for appropriately pressurizing one or the other side of a hydraulic cylinder.

The steering control valve 10 is actuated in response to rotative movement of the steering wheel 15 which acts through the fail-safe valve 12 to be described at this time. As best seen in FIGURE 2, the fail-safe valve 12 includes a cylindrical housing 70 which is fixed at one end to the housing 48 of the steering control unit 10. The housing 70 is provided with a central bore 71 that communicates with a pair of transverse ports 72 and 74 that respectively connect with the conduits 30 and 32, as seen in FIGURE 1. As in the case of the steering control valve, the fail-safe valve is provided with a sleeve valve 76 and spool valve 78 which are interconnected by a pin 80 and leaf springs 82, as seen in FIGS. 3 and 5, respectively. The opening 84 through which the pin extends in the spool valve is substantially identical in size to that of the pin so that the latter fits snugly therein while the aperture 86 is oblong in shape so as to provide a limited amount of relative movement between the spool and sleeve valves. A shaft 88 connects the sleeve valve 76 with the steering wheel 15 so that rotation of the latter is transmitted through the fail-safe valve to the steering control valve 10 in a manner to be described.

An axially extending bore 90 is provided in the spool valve 78 and serves as a passage for connecting the axially-spaced annular chambers 91 and 92 which respectively communicate with the ports 74 and 72 when the spool and sleeve valves are in the neutral position as seen in the drawings in FIGS. 2 and 4. During such neutral position, the springs 82 maintain four radially extending passages 94 provided in the spool valve 78 in alignment with an equal amount of oversize ports 96 formed in the sleeve valve 76. At the same time, four slot-shaped passages 100 in the spool valve 78 are in alignment with an equal number and similarly shaped ports 102 formed in the sleeve valve adjacent the chamber 91. Thus, it should be apparent that whenever the fail-safe valve is in the neutral position, oil passes freely between the ports 74 and 72. However, upon a predetermined movement of the spool valve 78 relative to the sleeve valve 76, the passages 100 will be closed so that oil flow will be blocked.

As aforementioned, the fail-safe valve is connected to the steering control valve through the shaft 14. In this connection, it should be noted that a gear 104 is fixed with the spool valve 78 and is connected to a gear 106 on the shaft 14 by a splined collar 108. The opposite end of the shaft 14 is also provided with a gear 110 which is connected to and drives the spool valve 56 of the steering control valve 10 as described earlier. Moreover, it should be noted that the leaf springs 82 incorporated with the fail-safe valve have a spring force which is greater than that of the leaf springs 62 employed with the steering control valve. Thus, the resistance necessary for causing sleeve valve 76 to move relative to the spool valve 78 is greater than that required for moving spool valve 56 relative to the sleeve valve 54. This is necessary so that passages 100 communicate with ports 102 during all operating conditions of the system, except in instances where the flow control valve 24 sticks in the open position which will be explained in the description of the operation of the invention which follows.

Assuming that the steering control valve has a flow capacity of 6 g.p.m. and the pump is delivering 20 g.p.m., the flow control valve, when operating properly, will divert the excess 14 g.p.m. through conduits 28, 30, fail-safe valve 12, and conduit 32 to the reservoir 20. Further, assuming the steering wheel 14 is in the neutral position, the oil metered by the flow-control valve into conduit 26 will pass through port 68 and be returned to the reservoir via port 69 and conduit 45. Under these conditions, should the steering wheel be rotated to the left or right from the neutral position, the leaf springs 82 will maintain the spool valve 78 and sleeve valve 76 in a fixed position relative to each other so that passages 100 and 102 are aligned as seen in FIGURE 4. The net result is a small degree of rotation of gear 104 which movement is transmitted to spool valve 56 through the shaft 14. Inasmuch as the leaf springs 62 have a spring force substantially less than that of springs 82, and the metering device 63 acts to resist rotative movement of sleeve valve 54, the spool valve 56 rotates relative to the sleeve valve 54 and the pump 18 is connected with port 50 or 52 as described earlier.

If for some reason the flow control valve sticks in the open position and the steering wheel is rotated from the straight-ahead position, the pump will be connected directly to the reservoir 20 through the fail-safe valve, as aforementioned. Thus, the steering control valve is by-passed and the metering or motor portion 63 of the steering control valve 10 will not receive fluid flow in response to turning movement of the steering wheel 15. As a result, as soon as the lost motion in the steering control valve is taken up, further movement of shaft 14 is resisted and in order to overcome the increased resistance the operator will have to apply a greater amount of turning force on the steering wheel 15. The added force overcomes the spring force of the leaf springs 82 and results in relative movement between the spool valve 78 and the sleeve valve 76. When this occurs the passages 100 are blocked by the sleeve valve 76 so as to prevent fluid from being directed to reservoir 20 through the fail-safe valve. This causes a pressure increase in conduit 30 that opens the check valve 33 and permits the full fluid flow to pass through conduit 26 to the steering control valve 10. Thus, steering is maintained without endangering the vehicle or operator.

Various changes and modifications can be made in the above-described hydraulic steering system without departing from the spirit of the invention. It should be understood that such changes and modifications are contemplated and therefore I do not wish to be limited except by the scope of the appended claims.

What is claimed is:

1. A hydraulic steering system for a vehicle, comprising a fluid cylinder for effecting steering of said vehicle, a fluid reservoir, a pump drawing fluid from the reservoir, a full power steering control valve for selectively connecting said pump to opposite ends of said fluid cylinder, a steering wheel for actuating said steering control valve, a flow control valve connected to the reservoir and interposed between the pump and the steering control valve, said flow control valve providing a predetermined fluid flow to said steering control valve with excess fluid flow generated by said pump being directed to said reservoir, valve means located between said flow control valve and the reservoir for blocking said excess fluid flow therebetween whenever said flow control valve sticks to cause substantially the entire fluid flow to bypass the steering control valve, and means for connecting said entire fluid flow with the steering control valve when said valve means blocks said fluid flow.

2. A hydraulic steering system for a vehicle, comprising a double-acting cylinder for effecting steering of said vehicle, a fluid reservoir, a pump drawing fluid from the reservoir, a full power steering control valve connected to said pump for selectively connecting the latter with opposite ends of said cylinder, a steering wheel for actuating said steering control valve, a flow control valve connected to the reservoir and interposed between the pump and the steering control valve, said flow control valve connected with a first conduit and providing a predetermined fluid flow therethrough to said steering control valve, a second conduit connected to said flow control valve for receiving excess fluid flow generated by said pump and directing it to said reservoir, valve means located in said second conduit between said flow control valve and the reservoir for blocking fluid flow therebetween whenever said flow control valve sticks and causes the entire fluid flow to bypass the steering control valve, a third conduit connected to said steering control valve and to said second conduit between the flow control valve and the valve means, and a check valve in said third conduit for connecting the pump with the steering control valve when said valve means blocks said fluid flow.

3. A hydraulic steering system for a vehicle, comprising a double-acting cylinder for effecting steering of said vehicle, a fluid reservoir, a pump drawing fluid from the reservoir, a full power steering control valve connected to said pump for selectively connecting the latter with opposite ends of said cylinder, a steering wheel for actuating said steering control valve, a flow control valve connected to the reservoir and interposed between the pump and the steering control valve, said flow control valve connected with a first conduit and providing a predetermined fluid flow therethrough to said steering control valve, a second conduit connected to said flow control valve for receiving excess fluid flow generated by said pump and directing it to said reservoir, valve means operatively connected to said steering wheel, said valve means located in said second conduit between said flow control valve and the reservoir for blocking fluid flow therebetween whenever said flow control valve sticks and causes the entire fluid flow to bypass the steering control valve, a third conduit connected to said steering control valve and to said second conduit between the flow control valve and the valve means, and a check valve in said third conduit for connecting the pump with the steering control valve when said valve means blocks said fluid flow.

4. A hydraulic steering system for a vehicle, comprising a double-acting cylinder for effecting steering of said vehicle, a fluid reservoir, a pump drawing fluid from the reservoir, a full power steering control valve connected to said pump for selectively connecting the latter with opposite ends of said cylinder, a steering wheel for actuating said steering control valve, a flow control valve connected to the reservoir and interposed between the pump and the steering control valve, said flow control valve connected with a first conduit and providing a predetermined fluid flow therethrough to said steering control valve, a second conduit connected to said flow control valve for receiving excess fluid flow generated by said pump and directing it to said reservoir, valve means operatively connected to said steering wheel and having an open and closed position, said valve means located in said second conduit between said flow control valve and the reservoir for normally maintaining said open position but adapted to be moved by said steering wheel to the closed position to block fluid flow in the second conduit whenever said flow control valve sticks and causes the entire fluid flow to bypass the steering control valve, a third conduit connected to said steering control valve and to said second conduit between the flow control valve and the valve means, and a check valve in said third conduit for connecting the pump with the steering control valve when said valve means is in said closed position.

5. A hydraulic steering system for a vehicle, comprising a double-acting cylinder for effecting steering of said vehicle, a fluid reservoir, a pump drawing fluid from the reservoir, a full power steering control valve connected to said pump for selectively connecting the latter with opposite ends of said cylinder, a steering wheel for actuating said steering control valve, a flow control valve connected to the reservoir and interposed between the pump and the steering control valve, said flow control valve connected with a first conduit and providing a predetermined fluid flow to said steering control valve, a second conduit connected to said flow control valve for receiving excess fluid flow generated by said pump and directing it to said reservoir, valve means located in said second conduit between said flow control valve and the reservoir, said valve means comprising a first and second valve member, passages formed in said first and second valve members for connecting fluid flow from said flow control valve with said reservoir, spring means associated with said first and second valve members for normally holding the adjacent passages in the respective members in a position where they register with each other to allow fluid flow through said valve means to said reservoir, a lost-motion connection joining said valve members to said steering wheel so that whenever the steering control valve is disconnected with the pump then turning of the steering wheel overcomes said spring means and results in said one of said valve members moving relative to the other valve member to block fluid flow through said valve means, a third conduit connected to said steering control valve and to said second conduit between the flow control valve and the valve means, and a check valve in said third conduit for connecting the pump with the steering control valve when said valve means blocks said fluid flow.

6. A hydraulic steering system for a vehicle, comprising a double-acting cylinder for effecting steering of said vehicle, a fluid reservoir, a pump drawing fluid from the reservoir, a full power steering control valve connected to said pump for selectively connecting the latter with opposite ends of said cylinder, a steering wheel for actuating said steering control valve, a flow control valve connected to the reservoir and interposed between the pump and the steering control valve, said flow control valve connected with a first conduit and providing a predetermined fluid flow to said steering control valve, a second conduit connected to said flow control valve for receiving excess fluid flow generated by said pump and directing it to said reservoir, valve means located in said second conduit between said flow control valve and the reservoir, said valve means comprising a housing, a first and second valve member rotatably supported in said housing, passages formed in said housing and said first and second valve member for connecting fluid flow from said flow control valve with said reservoir, spring means associated with said first and second valve members for normally holding the adjacent passages in the respective members in a position where they register with each other to allow fluid flow through said valve means to said reservoir, a lost-motion connection joining said valve members to said steering wheel so that whenever the steering control valve is disconnected with the pump then turning of the steering wheel overcomes said spring means and results in said one of said valve members moving relative to the other valve member to block fluid flow through said valve means, a third conduit connected to said steering control valve and to said second conduit between the flow control valve and the valve means, and a check valve in said third conduit for connecting the pump with the steering control valve when said valve means blocks said fluid flow.

7. A hydraulic steering system for a vehicle, comprising a double-acting cylinder for effecting steering of said vehicle, a fluid reservoir, a pump drawing fluid from the reservoir, a full power steering control valve connected to said pump for selectively connecting the latter with opposite ends of said cylinder, a steering wheel for actuating said steering control valve, a flow control valve connected to the reservoir and interposed between the pump and the steering control valve, said flow control valve connected with a first conduit and providing a predetermined fluid flow to said steering control valve, a second conduit connected to said flow control valve for receiving excess fluid flow generated by said pump and directing it to said reservoir, valve means operatively connected to said steering control valve and located in said second conduit between said flow control valve and the reservoir, said valve means comprising a housing, a first and second valve member rotatably and concentrically supported in said housing, radial passages formed in said housing and said first and second valve member for connecting fluid flow from said flow control valve with said reservoir, spring means associated with said first and second valve members for normally holding the adjacent passages in the respective members in a position where they register with each other to allow fluid flow through said valve means to said reservoir, a lost-motion connection joining said valve members to said steering wheel so that whenever the steering control valve is disconnected with the pump then turning of the steering wheel overcomes said spring means and results in said one of said valve members moving relative to the other valve member to block fluid flow through said valve means, a third conduit connected to said steering control valve and to said second conduit between the flow control valve and the valve means, and a check valve in said third conduit for connecting the pump with the steering control valve when said valve means blocks said fluid flow.

8. The hydraulic steering system of claim 7 wherein said lost-motion connection includes a pin fixed with one of said valve members, and an oblong slot formed in the other of said valve members for accommodating one end of said pin.

No references cited.